United States Patent
Ho et al.

(10) Patent No.: US 7,680,039 B2
(45) Date of Patent: Mar. 16, 2010

(54) NETWORK LOAD BALANCING

(75) Inventors: Michael Ho, Vancouver (CA); Manoj Wadekar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1081 days.

(21) Appl. No.: 11/343,720

(22) Filed: Jan. 31, 2006

(65) Prior Publication Data

US 2007/0064605 A1 Mar. 22, 2007

Related U.S. Application Data

(63) Continuation-in-part of application No. 11/219,528, filed on Sep. 2, 2005, now abandoned.

(51) Int. Cl.
*G01R 31/08* (2006.01)

(52) U.S. Cl. .................................................. 370/230

(58) Field of Classification Search .............. 370/229, 370/230, 230.1, 235, 236, 237, 241
See application file for complete search history.

(56) References Cited

U.S. PATENT DOCUMENTS

| | | | |
|---|---|---|---|
| 6,070,074 A | | 5/2000 | Perahia et al. |
| 6,424,624 B1 * | | 7/2002 | Galand et al. ............... 370/231 |
| 6,532,212 B1 | | 3/2003 | Soloway et al. |
| 6,765,866 B1 | | 7/2004 | Wyatt |
| 6,987,741 B2 | | 1/2006 | Kelly et al. |
| 7,042,842 B2 * | | 5/2006 | Paul et al. .................... 370/229 |
| 7,139,247 B2 | | 11/2006 | Desai et al. |
| 2003/0217141 A1 | | 11/2003 | Suzuki et al. |
| 2004/0184483 A1 * | | 9/2004 | Okamura et al. ............ 370/477 |
| 2005/0088969 A1 * | | 4/2005 | Carlsen et al. .............. 370/229 |
| 2007/0053294 A1 | | 3/2007 | Ho et al. |

OTHER PUBLICATIONS

Feng, W.-C. , et al., "The BLUE Active Queue Management Algorithms", *IEEE/ACM Transactions on Networking*, 10(4), (Aug. 2002),513-528.
Wadekar, M., et al., "System and Method for Managing Network Congestion", U.S. Appl. No. 11/227,897, filed Sep. 15, 2005.
"U.S. Appl. No. 11/219,528 Non-Final Office Action mailed on Oct. 27, 2008", 20 pgs.
"U.S. Appl. No. 11/219,528 Non-Final Office Action mailed Jun. 25, 2008.", 11 pgs.

* cited by examiner

*Primary Examiner*—Kwang B Yao
*Assistant Examiner*—Anh Ngoc Nguyen
(74) *Attorney, Agent, or Firm*—Schwegman, Lundberg & Woessner, P.A.

(57) ABSTRACT

Apparatus, systems, methods, and articles described generally herein may receive a first packet marked with a congestion indicator (CI). Upon receipt of the CI, a load-balancing operation may be performed among a plurality of physical links upstream from a point of congestion to alleviate the congestion. Other embodiments may be described and claimed.

24 Claims, 4 Drawing Sheets

NETWORK LOAD BALANCING

RELATED APPLICATION

This application is a Continuation-in-Part of U.S. patent application Ser. No. 11/219,528, titled "Network Load Balancing Apparatus, Systems, and Methods," filed Sep. 2, 2005 now abandoned, which is incorporated herein by reference.

TECHNICAL FIELD

Various embodiments described herein relate to computer networking systems generally, including apparatus, systems, and methods used to perform network load balancing.

BACKGROUND INFORMATION

Existing Ethernet standards may define ways to aggregate multiple Ethernet communication links. The aggregated Ethernet links may behave as a single Ethernet link with a throughput greater than any one of the contributing links. That is, link aggregation may enable higher layer protocols to communicate between two points connected by several lower capacity links ("elementary links") as if the two points were connected by a higher capacity link. According to methods specified in an Institute of Electrical and Electronic Engineers 802.3ad standard, packets contributing to an aggregate bandwidth may be divided across the multiple links using a predetermined hashing procedure. These techniques may be employed in network switching architectures. Additional information regarding the 802.3ad standard may be found in "IEEE 802.3AD Standard for Information Technology—Local and Metropolitan Area Networks—Part 3: Carrier Sense Multiple Access with Collision Detection (CSMA/CD) Access Method and Physical Layer Specifications—Aggregation of Multiple Link Segments" (2000), and in "802.3™ IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specifications" (published March 2002). See Chapter 43 of the latter publication, "Link Aggregation."

Methods detailed in standard 802.3ad may attempt to evenly distribute packets based upon destination and source addresses and based perhaps on other header fields within the packets. These methods may operate to prevent packets associated with a conversation from being received out of order at a destination. A "conversation" as used herein is defined as a sequence of packets with identical source and destination addresses. Packets contributing to a conversation may need to be processed in a particular order by an eventual receiver. Out-of-order reception may occur because of variable and unequal delays associated with the elementary links. These delays may be caused by differential trace lengths, by traversing buffers of different sizes, and by intermediate switching elements located between transmission points, among other possible causes.

The hashing procedure defined in 802.3ad may allocate all frames associated with a given conversation to a port associated with a particular elementary link. Existing load balancing methods may not consider other aspects of traffic load allocation, however. It may be possible to load an elementary link associated with a particular priority of traffic more heavily than another elementary link of equal priority. This may result in an underutilization of the total available bandwidth.

According to a link aggregation control protocol (LACP) in 802.3ad, a marker may be sent by a "distributor" to a "collector" following transmission of a final packet across a link from which traffic is to be re-directed (an "old" link). The collector may send a marker response to the distributor. Upon detecting the response, the distributor may be informed that the last of the packets has been received and that it is safe to transmit packets along the new link. This process may require buffering at an ingress transmission point.

DETAILED DESCRIPTION

Figure 1:
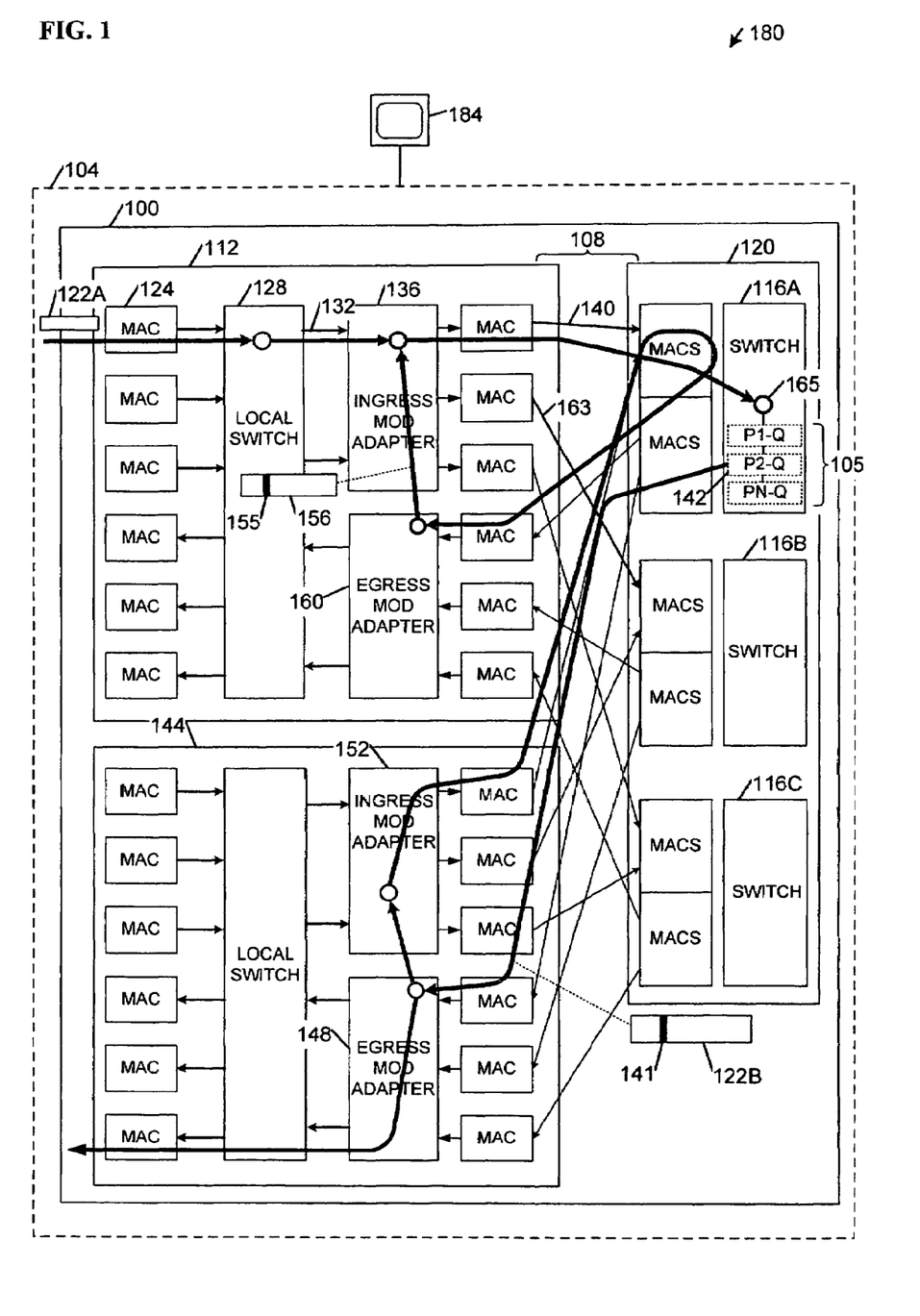
FIG. 1 is a block diagram of an apparatus and a representative system according to various embodiments of the invention.

FIG. 1 comprises a block diagram of an apparatus 100 and a system 180 according to various embodiments of the invention. Some embodiments may comprise a network switch 104, including perhaps a dynamically load-balanced switch. Levels of queues 105 inside the switch 104 may be indicative of loading on connections within the switch 104. Thus, an increasing queue size may indicate that a load on a connection utilizing the queue is increasing. Queue levels may result from overall traffic patterns and from a mix of traffic of different priorities from various line cards within the switch 104. Because traffic patterns and the priority mix may change over time, a load associated with a given connection may change. Switching efficiencies may be enhanced if internal load balancing functions dynamically adapt to changes in loads on the internal connections. Ingress and egress points and/or line cards referred to hereinafter are intended to convey a direction of packet traffic flow. That is, traffic may flow into the network switch 104 through an ingress line card 112 and flow out of the switch 104 through an egress line card 144.

Congestion management mechanisms associated with embodiments disclosed herein may include techniques such as those found in an IEEE 802.3ar standard, whether proposed or finalized. For more information regarding IEEE 802.3ar, please refer to interim documents from the IEEE 802.3 Congestion Management Task Force. These documents may include IEEE Information technology—Telecommunications and Information Exchange Between Systems—Local and Metropolitan Area Networks—Specific Requirements Part 3: Carrier Sense Multiple Access with Collision Detection (CSMA/CD) Access Method and Physical Layer Specifications Amendment: Enhancements for Congestion Management. These techniques may be based upon congestion detection using an active queue management method such as random early detection (RED). The techniques may cause packets to be marked or dropped according to a RED algorithm if the packets pass through congested queues in a central switching fabric 120. Congestion may be indicated at the egress line card 144 or other egress point within the network switch 104. The congestion indication may be passed up to higher protocol layers associated with an open systems interconnection (OSI) model, including perhaps as a layer 2 congestion indication (L2-CI) marker for rate control.

The congestion status may also be communicated to the ingress line card 112 or other ingress point from within the switching fabric 120 via a backward congestion notification (BCN) packet. Alternatively, the congestion status may be communicated back to the ingress line card 112 from the egress line card 144 via a remote congestion indicator (RCI) inserted into a packet returning to the ingress line card.

The network switch 104 may distribute packets across physical links 108 between a line card 112 and switching components 116A, 116B, and 116C in the central switching fabric 120. A composite ingress bandwidth associated with packets flowing into the line card 112 may be distributed among the physical links 108, wherein each link connects to one of the switching components 116A, 116B, and 116C in the central fabric 120. Each switching component may thus need to handle only a fraction of the composite bandwidth from each line card within the network switch 104. This architecture may operate to increase the number of line cards supported by the switching components 116A, 116B, and 116C. Load balancing among the physical links 108 may enable large bandwidth, high-throughput systems to be implemented with lower capacity, lower cost switching components.

In some embodiments the load balancing may occur at the ingress line card 112. The egress line card 144 may be capable of reconstructing conversations originating from multiple ingress line cards. The switch component 116A may transparently forward any layer 2 protocol packet (e.g., an Ethernet packet) used to control load balancing operations from the ingress line card 112 to the egress line card 144. That is, the switch component 116A may not be directly involved in the load balancing operation.

In an example embodiment, a first packet 122A may arrive at the ingress line card 112 at a media access control (MAC) component 124. The first packet 122A may be processed and then passed to the local switch 128 for local switching and classification. Should the first packet 122A require a transfer to another line card in the system, it may be directed to an uplink 132. The uplink 132 may couple the local switch 128 to an ingress modular adapter 136. The ingress modular adapter 136 may comprise a load-balancing component.

Prior to the arrival of the first packet 122A at the ingress modular adapter 136, a conversation with which the first packet 122A is associated may have been mapped to a physical link 140 coupling the ingress modular adapter 136 to the switch component 116A. As the first packet 122A arrives at the ingress modular adapter 136, its header may be inspected to determine the conversation with which the first packet 122A is associated. The first packet 122A may then be moved to the physical link 140 to which the conversation is mapped. A dynamic mapping technique may be employed such that packets associated with a given conversation are received in an appropriate order at a destination.

As the first packet 122A traverses the physical link 140 assigned by the load balancing operation, it may enter the switch component 116A on the central switch fabric 120. Inside the switch component 116A a header associated with the first packet 122A may again be inspected. The inspection may determine where and with what priority the first packet 122A should be enqueued as it waits along with other packets that have entered the switch component 116A from the various line cards. Thus, a unique queue may exist within the switch component 116A for a given priority of traffic bound for a given egress point.

Because many packets from many line cards may be queued to exit to the same egress point, queues 105 inside the switch component 116A may fill, causing congestion. A packet arriving at a congested queue 142 may be dropped. Alternatively, the packet may be marked with an L2-CI marker (also referred to herein as "CI 141") as it leaves the congested queue 142. Some embodiments may generate a special BCN packet for transmission to the ingress line card 112 to indicate congestion, as previously mentioned. These congestion management processes may proceed according to weighted random early detection thresholds and methods. First packet 122B marked with the CI 141 may be used to reduce the traffic load at an appropriate ingress node to avoid packet drop within the central switch fabric 120.

As the first packet 122B leaves the switch component 116A and enters the egress line card 144, an egress modular adapter 148 may inspect the first packet 122B for the CI 141 marker. The inspection may determine that a point of congestion exists within the switch component 116A according to the CI 141 marker. Since the CI 141 marker is carried by the packet 122B, congestion status may be determined with a packet-by-packet granularity. This may enable the egress line card 144 to determine whether action is required for the entire ingress line card 112 or for specific priorities of traffic.

The egress modular adapter 148 may inform an ingress modular adapter 152 associated with the egress line card 144 to insert an RCI 155 into a second packet 156. The second packet 156 may be bound for the ingress line card 112 from which the first packet 122B carrying the CI 141 marker originated. A priority associated with the second packet 156 may be equal to or greater than that of the first packet 122B. This scenario may assume that communication through the network switch 104 is bi-directional. If no significant traffic is flowing in a reverse direction when marker forwarding is required, the second packet 156 may comprise a dedicated packet created to communicate the RCI to the ingress line card 112. The dedicated packet may be similar to the BCN packet.

Upon arrival at an egress modular adapter 160 associated with the ingress line card 112, the RCI 155 may be extracted and interpreted. The interpretation may clarify that traffic of a priority associated with the first packet 122A on the physical link 140 is congested. The egress modular adapter 160 may pass this information to the ingress modular adapter 136. The ingress modular adapter 136 may remap conversations across the physical links 108 to relieve the congestion experienced by the first packet 122B.

To enable quality of service (QoS), the switch fabric 120 may afford preferential treatment to high priority traffic by classifying and enqueuing packets by priority, as previously described. To prevent packets associated with a given conversation from arriving out of order at the destination, the load balancing process may also distinguish between conversations of different priorities. The load balancing process may take into consideration a worst-case latency difference between the physical links 108.

As the level of the queue 142 associated with a particular priority exceeds predefined threshold levels, the congestion management mechanism may inform the upstream balancing process to react, as previously described. The load balancing process may attempt to move conversations associated with the indicated priority from the current physical link 140 to a less-congested link 163. Re-distribution mechanisms may take into account relative levels of congestion associated with the different priorities of traffic spanning the different links and an effective load of each conversation. Various integration filters may be applied to RCIs associated with the different priorities of traffic to determine relative levels of congestion in the queues 105 associated with the different priorities. Conversation packet counters may be used to determine effective loads of ingress conversations.

In an example embodiment, a re-distribution mechanism may move a lightly-loaded conversation from a more-congested link associated with a particular priority of traffic to a less-congested link associated with the particular priority of traffic. The mechanism may then wait for a predetermined period of time before repeating the link-switching operation for the particular priority of traffic. This process may repeat until congestion decreases to an acceptable threshold.

The re-distribution mechanism may limit remapping to an entire conversation at once. Such restriction may prevent remapping some packets associated with a conversation to one link and other packets associated with the same conversation to another link. The mechanism may also prevent packet duplication across multiple physical links. The mechanism may further prevent remapping until a configurable settling time has expired. This may allow switch fabric queues to stabilize and short-term congestion points caused by the remapping to recover.

Further protection against the disordering of packets during conversation remapping operations may include disallowing the reception of packets associated with the remapped conversation from the new link until a worst-case differential link latency time has expired. This may prevent packets on the new link from arriving before previously-transmitted packets traveling along the old link. Some embodiments may use a protocol to mark a last packet of the conversation received from the old link. The last-packet marker may indicate to a link receiver that it can now accept packets of the same conversation from the new link. Different embodiments may use various combinations of these techniques. For example, packets may be accepted at the link receiver after a worst-case differential link latency timer expires, to protect stability of the mechanism in case a last-packet marker packet is dropped.

Some embodiments of the invention may utilize existing protocols, including perhaps an IEEE 802.3ad LACP. Inventive features of certain embodiments of the invention may include enhancements to existing protocols. In some embodiments, LACP payload data units (LACP PDUs) may be transparently forwarded through a layer 2 switching element. The LACP PDU may carry the last-packet marker previously described. Some embodiments may proceed to transmit packets during a conversation remapping operation without waiting for an LACP response.

Some embodiments of the current invention may transparently forward LACP PDUs through the switching fabric 120 by encapsulating the LACP PDUs in a MAC-in-MAC encapsulation. The outer MAC header may resemble MAC headers of a conversation being remapped. The LACP PDU may thus pass through the same queues within the switching components 116A, 116B, and 116C as the conversation associated with the LACP PDU. The LACP PDU may pass through the queues following the last packet associated with the conversation. Some embodiments may modify LACP to insert a unicast egress port address as a destination address into control packets that will be switched by intermediate bridges. The destination address may uniquely identify the egress port for affected conversations.

Some embodiments may add intelligence and buffering at the egress end-point to reduce the time required to remap conversations to less-congested links. The receiver may accept packets associated with the remapped conversation from the old link while it buffers packets from the new link. The receiver may switch over to the new link upon receiving the LACP marker. The marker protocol may be used with the timer method, as previously described. If an LACP packet is lost, packets may be accepted from the new link upon the expiration of the configurable timer.

The marker and timer methods may thus delay the acceptance of the packets arriving from the new link until all the packets from the old link have arrived. This process may effectively cap the net latency of the conversation to the latency of the old link. Some embodiments may employ an egress buffer size corresponding approximately to a difference between a worst-case switch latency and a best-case switch latency for a given flow.

The apparatus 100 may thus include an egress line card 144 in a network switch 104 to receive a first packet 122B marked with a CI 141. A switch component 116A in a central switching fabric 120 may be coupled to the egress line card 144 and may set the CI 141. An ingress line card 112 may be coupled to the switch component 116A to perform a load-balancing operation among a plurality of physical links 108. The plurality of physical links 108 may be located upstream from a point of congestion 165, and may be adapted to couple the ingress line card 112 to the switch component 116A. The load-balancing operation may occur upon receipt of an RCI 155 at the ingress line card 112. The RCI 155 may be triggered by the CI 141 to alleviate the congestion at the point of congestion 165.

The apparatus 100 may also include an ingress modular adapter component 136 of the ingress line card 112. The ingress modular adapter component 136 may map a conversation associated with the first packet 122A to a first physical link 140 selected from the plurality of physical links 108. An egress modular adapter component 160 of the ingress line card 112 may receive the RCI 155 from the egress line card 144. The egress modular adapter component 160 may pass the RCI 155 to the ingress modular adapter component 136 of the ingress line card 112. Upon receipt of the RCI 155, the ingress modular adapter component 136 may perform the load-balancing operation. It is noted that local switches, switch components, modular adapters, and switching fabrics within the network switch 104 may comprise processors (including network processors), application specific integrated circuits and discrete logic, among other elements.

In another embodiment, a system 180 may include one or more of the apparatus 100, including an egress line card 144, a switch component 116A, and an ingress line card 112, among other elements. The system 180 may also include a display 184 coupled to the network switch 104 to perform configuration operations. The display 184 may comprise a cathode ray tube display or a solid-state display such as a liquid crystal display, a plasma display, or a light-emitting diode display, among others.

The system 180 may further include an egress modular adapter component 148 of the egress line card 144 to inspect the first packet 122B for the CI 141. An ingress modular adapter component 152 of the egress line card 144 may insert an RCI 155 into a second packet 156 to be transmitted to the egress modular adapter component 160 of the ingress line card 112.

Any of the components previously described can be implemented in a number of ways, including embodiments in software. Thus, the apparatus 100; switch 104; queues 105, 142; physical links 108, 140, 163; line cards 112, 144; switching components 116A, 116B, 116C; central switching fabric 120; packets 122A, 122B, 156; media access control (MAC) component 124; local switch 128; uplink 132; modular adapter components 136, 148, 152, 160; congestion indicator (CI) 141; remote congestion indicator (RCI) 155; point of congestion 165; system 180; and display 184 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

The apparatus and systems described may be used in applications other than network link load-balancing based upon downstream indications of congestion. The illustrations of apparatus 100 and system 180 are intended to provide a general understanding of the structure of various embodiments. Other combinations may be possible.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, and others. Some embodiments may include a number of methods.

Figure 2A:
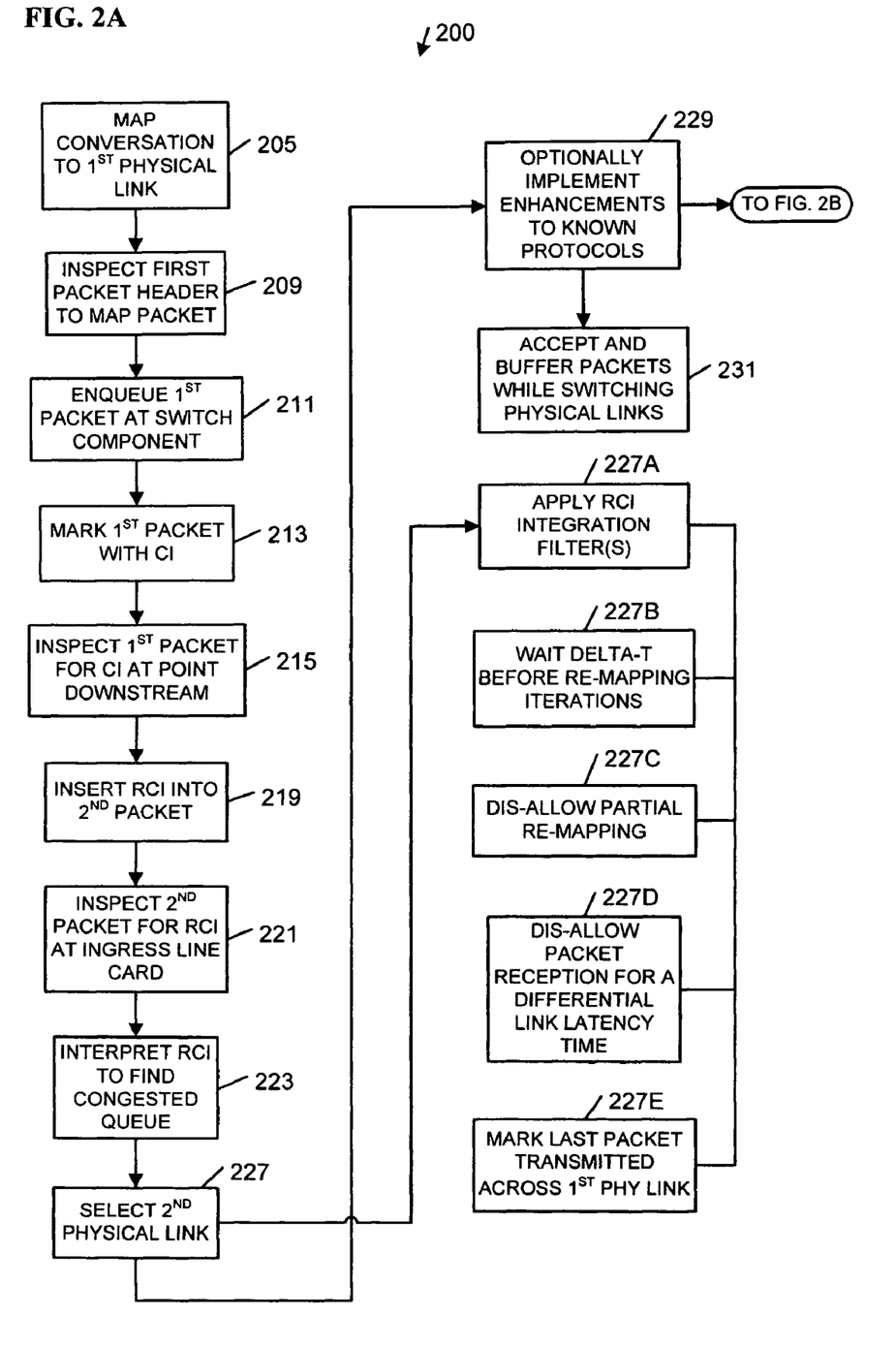
FIGS. 2A and 2B are a flow diagram illustrating several methods according to various embodiments of the invention.
Figure 2B:
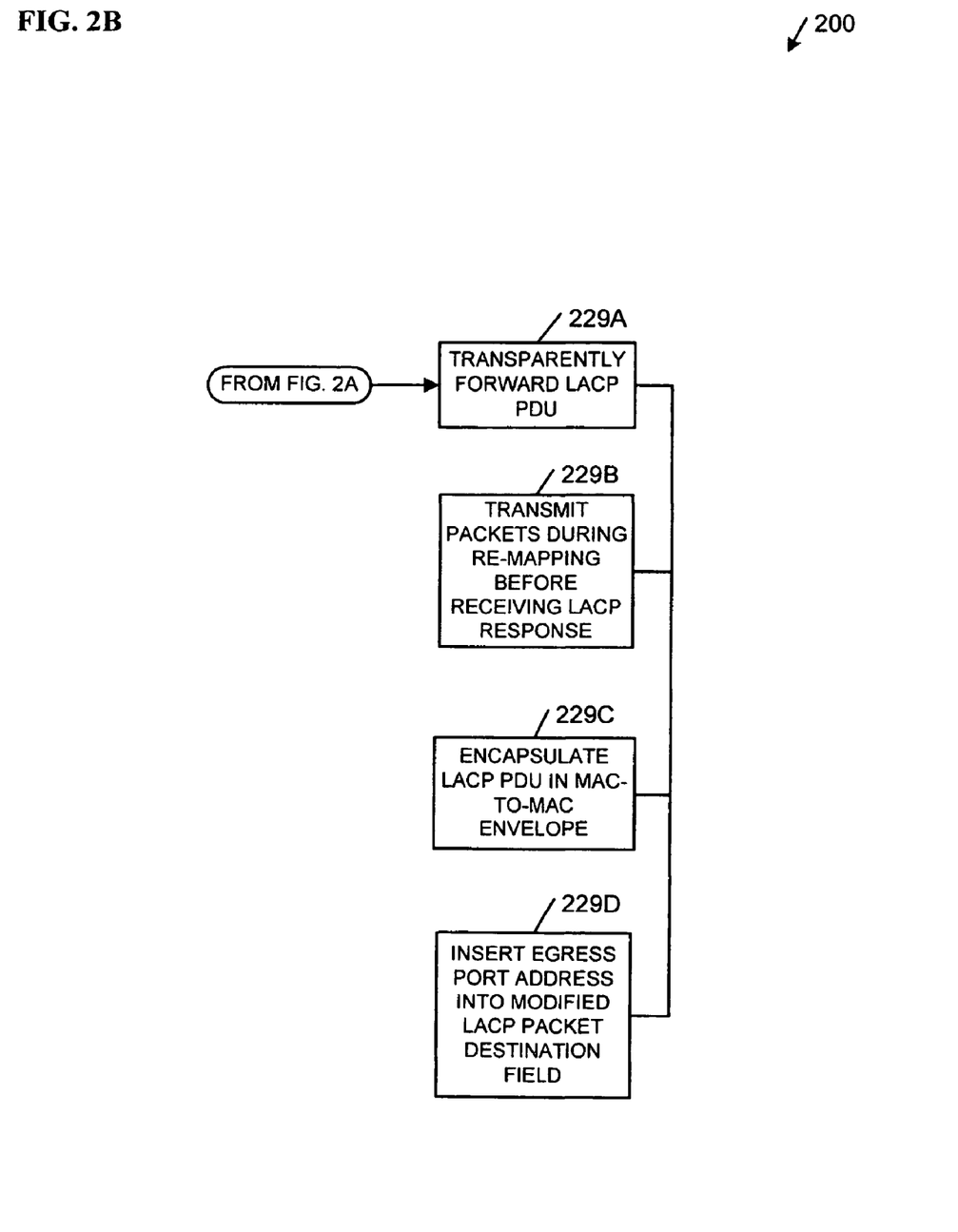

FIGS. 2A and 2B are a flow diagram representation illustrating several methods according to various embodiments of the invention. A method 200 may include performing a load-balancing operation in a packet-switched network. A plurality of physical links upstream from a point of congestion may be load balanced to alleviate congestion downstream. The method 200 may include receiving a first packet marked with a CI, perhaps at a load-balancing control point upstream. The CI may comprise a layer 2 CI according to an IEEE 802.3ar standard, actual or proposed.

In some versions of the method 200, the first packet may be received and the link load-balancing operation performed within a network switch. The plurality of physical links may be adapted to couple an ingress line card to a switch component within a switching fabric in the network switch. The link load-balancing operation may be performed at the ingress line card, and may comprise remapping a conversation from a first physical link to a second physical link. The first physical link and the second physical link may comprise links within the plurality of physical links. The conversation may comprise a sequence of packets with identical source and destination addresses. The packets may require processing in a particular order by an eventual receiver.

The method 200 may begin with mapping the conversation to the first physical link, at block 205. The first physical link may correspond to a priority of traffic associated with the conversation. That is, packets of a particular priority, including the first packet, may be part of the mapped conversation and may be directed to the first physical link. The method 200 may continue at block 209 with inspecting a header associated with the first packet at an ingress point within the network switch. The header may indicate whether the conversation and the first packet are in fact associated. For example, a particular conversation may include packets with a first source address and a first destination address. If, upon inspection, the header associated with the first packet is found to contain the first source address and the first destination address, the first packet may be considered to be associated with the particular conversation.

Upon traversing the first physical link, the first packet may appear at a switching component within the switching fabric. The first packet may be enqueued within the switching component to await a path out of the switching fabric and into an egress line card, at block 211. The method 200 may detect congestion within the switching fabric. The congestion may be detected based upon a level of a queue associated with a particular priority of traffic, among other methods. Suppose, for example, that the queue including the first packet is 75% full. At that level, the connection associated with the conversation including the first packet may be considered relatively more congested than a connection associated with a queue that is 50% full. Upon detecting the congestion, the method 200 may include marking the first packet with the CI, perhaps at the point of congestion, at block 213. Thus, a point of congestion may comprise a congested queue within the switch component, and the congested queue may correspond to a priority of traffic associated with the conversation.

The method 200 may continue at block 215 with inspecting the first packet for the CI at a point downstream from the point of congestion, after the packet has been released from the congested queue. The point downstream from the point of congestion may comprise an egress line card at an egress point in the network switch. Upon detecting that the first packet is marked with the CI at the point downstream, the method 200 may include inserting an RCI into a second packet bound for the ingress line card, at block 219.

The method 200 may also include inspecting the second packet at the ingress line card to extract the RCI, at block 221. The method 200 may further include interpreting the RCI to determine which queue is associated with the point of congestion traversed by the first packet, at block 223. The method 200 may also include selecting the second physical link to which the conversation will be remapped to alleviate the congestion, at block 227. Turning to FIG. 1, the remapping may occur at the ingress modular adapter 136, for example.

Selecting the second physical link may comprise one or more of several activities. Some of the activities may operate to prevent remapped packets from arriving out of a conversation sequence at a receiver in the switch fabric. Integration filtering techniques may be applied to RCIs associated with the conversation and to RCIs associated with other queues, over time, at block 227A. The integration filtering techniques may determine relative congestion among a plurality of congested queues. The integration filtering techniques may also establish minimum periods of time to wait before switching a previously-switched conversation. The method 200 may thus include waiting for a predetermined period of time after remapping the conversation and before again remapping the conversation, at block 227B. The method 200 may further include disallowing a partial remapping, at block 227C. That is, all packets associated with the conversation may be required to be remapped to the second physical link, and none to any other physical link. The method 200 may also include disallowing a receipt of a remapped packet at a remapped destination within the switching fabric until a worst-case differential link latency time has expired, at block 227D. The method 200 may further include marking a last packet associated with the remapped conversation to be transmitted across the first physical link, at block 227E. The marked last packet may operate to trigger a receiver at the second physical link to accept packets associated with the remapped conversation.

The method 200 may also include implementing several enhancements to known protocols, including an IEEE 802.3ad protocol, at block 229. The enhancements may include transparently forwarding an LACP PDU through a layer 2 switch component to carry the last-packet marker, at block 229A. Additional enhancements may include transmitting packets during the conversation remapping operation before receiving an LACP response, at block 229B. The LACP PDU may be encapsulated in a MAC-to-MAC encapsulation envelope to enable the LACP PDU to pass through queues associated with the conversation, at block 229C. Enhancements may also include inserting a unicast egress port address into a destination field associated with a modified LACP packet to be switched by intermediate bridges, at block 229D.

The method 200 may conclude at block 231 with accepting and buffering packets from the first physical link while switching over to the second physical link during the load-balancing operation.

It may be possible to execute the activities described herein in an order other than the order described. And, various activities described with respect to the methods identified herein may be executed in repetitive, serial, or parallel fashion.

A software program may be launched from a computer-readable medium in a computer-based system to execute functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
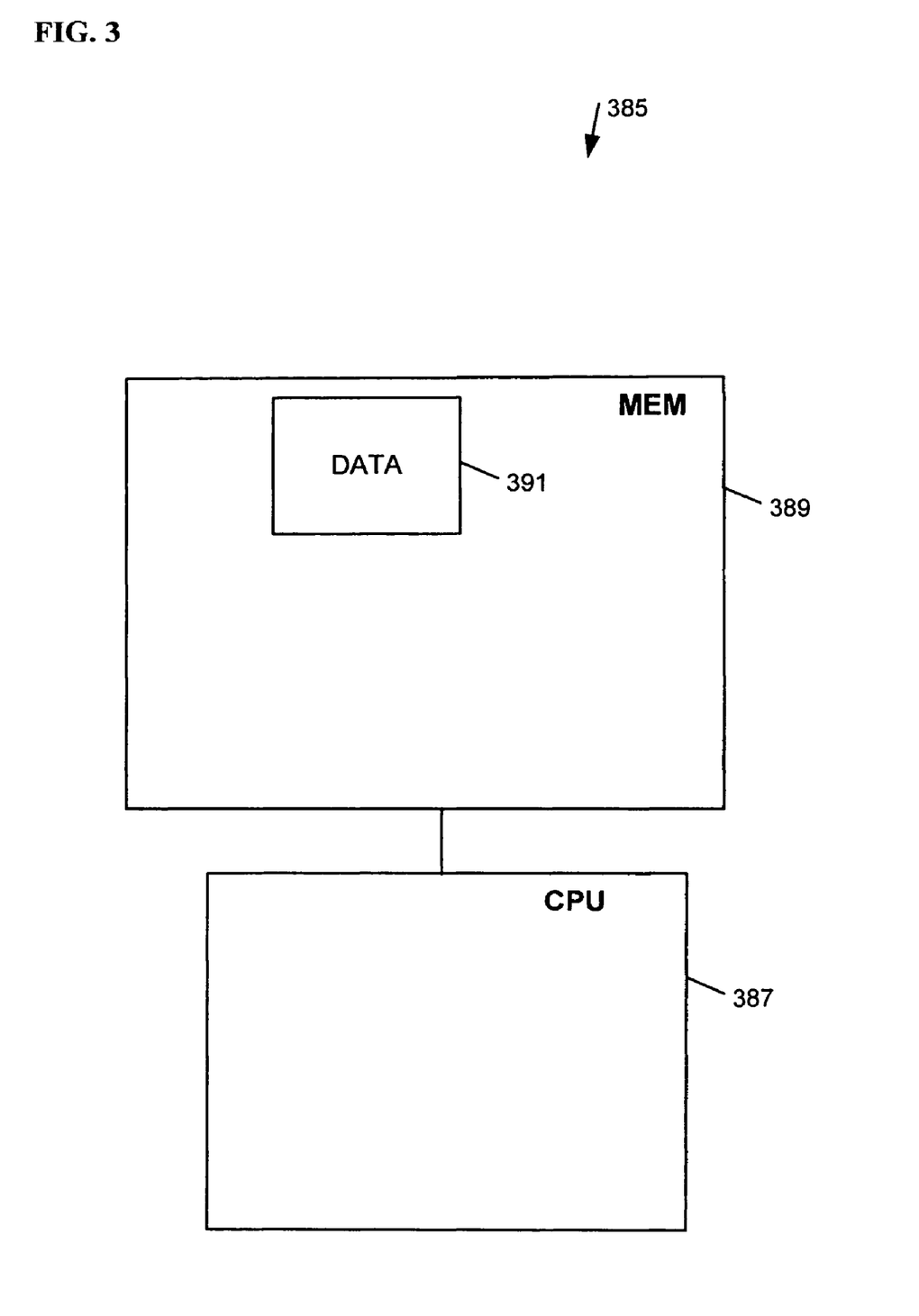
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) such as a central processing unit (CPU) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the CPU 387) performing a load-balancing operation, as previously described.

Implementing the apparatus, systems, and methods disclosed herein may operate to relieve congestion in a central switching fabric by load-balancing a plurality of physical links delivering packets to the switching fabric. The load-balancing operation may be triggered downstream from points of congestion by congestion indicators inserted into the packets at the points of congestion. The load balancing may thus be dynamic and adaptable to changing loading conditions. Cost savings may result, since the load-balancing operations may reduce peak loading of expensive switching components within the switching fabric. Fewer switching components may be required for a given number of port line cards supported by the central switching fabric.

Embodiments of the present invention may be implemented as part of a wired or wireless system Examples may also include embodiments comprising multi-carrier wireless communication channels (e.g., OFDM, DMT, etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method in a packet-switched network, including:

marking, within a network switch, a first packet with a congestion indicator (CI) at a point of congestion receiving and inspecting the first packet marked with the CI within the network switch at a point downstream from the point of congestion;

performing, within the network switch, a load-balancing operation among a plurality of physical links upstream from a point of congestion to alleviate the congestion upon receipt of the CI, the load-balancing comprising remapping a conversation from a first physical link to a second physical link and the plurality of physical links couple an ingress line card to a switch component within a switching fabric in the network switch;

inserting a remote congestion indicator (RCI) into a second packet bound for the ingress line card; and applying an integration filter to the RCI to determine relative congestion among a plurality of congested queues.

2. The method of claim 1, wherein the link load-balancing operation is performed at the ingress line card.

3. The method of claim 1, wherein the first physical link and the second physical link comprise links within the plurality of physical links.

4. The method of claim 1, wherein the conversation comprises a sequence of packets to be processed in a particular order by an eventual receiver.

5. The method of claim 1, further including:
mapping the conversation to the first physical link, wherein the first physical link corresponds to a priority of traffic associated with the conversation.

6. The method of claim 5, further including:
inspecting a header associated with the first packet at an ingress point within the network switch to determine whether the conversation and the first packet are associated.

7. The method of claim 1, wherein the point of congestion comprises a queue within the switch component.

8. The method of claim 7, wherein the queue corresponds to the priority of traffic.

9. The method of claim 1, wherein the point downstream from the point of congestion comprises an egress line card at an egress point in the network switch.

10. The method of claim 1, wherein the RCI is inserted at the point downstream upon detecting the CI.

11. The method of claim 1, further including:
inspecting the second packet at the ingress line card to extract the RCI;
interpreting the RCI to determine a queue associated with the point of congestion traversed by the first packet; and
selecting the second physical link to alleviate the congestion at the queue.

12. The method of claim 11, further including at least one of:
waiting for a predetermined period of time after remapping the conversation and before again remapping the conversation; and
remapping all packets associated with the conversation to the second physical link.

13. The method of claim 11, further including at least one of:
disallowing the remapping until a worst-case differential link latency time has expired; and
marking a last packet transmitted across the first physical link to trigger a receiver at the second physical link to accept packets associated with the remapped conversation, wherein the last packet is associated with the remapped conversation.

14. The method of claim 13, further including at least one of:
transparently forwarding a link aggregation control protocol (LACP) payload data unit (PDU) through a layer 2 switch component to carry the last-packet marker;
transmitting packets during the conversation remapping operation before receiving an LACP response;
encapsulating the LACP PDU in a media access control (MAC)-to-MAC encapsulation envelope to enable the LACP PDU to pass through queues associated with the conversation; and
inserting a unicast egress port address into a destination field associated with a modified LACP packet to be switched by intermediate bridges.

15. An article including a machine-accessible storage medium having associated information, wherein the information, when accessed and executed by a processor, results in a machine performing:
marking, within a network switch, a first packet with a congestion indicator (CI) at a point of congestion
receiving and inspecting the first packet marked with the CI within the network switch at a point downstream from the point of congestion;
performing, within the network switch, a load-balancing operation among a plurality of physical links upstream from a point of congestion to alleviate the congestion upon receipt of the CI, the load-balancing comprising remapping a conversation from a first physical link to a second physical link and the plurality of physical links couple an ingress line card to a switch component within a switching fabric in the network switch;
inserting a remote congestion indicator (RCI) into a second packet bound for the ingress line card; and
applying an integration filter to the RCI to determine relative congestion among a plurality of congested queues.

16. The article of claim 15, wherein the congestion indicator comprises a layer 2 congestion indicator according to an Institute of Electrical and Electronic Engineers 802.3ar standard.

17. The article of claim 15, wherein the information, when accessed, results in a machine performing:
accepting and buffering packets from a first physical link while switching over to a second physical link during the load-balancing operation.

18. An apparatus, including:
an egress line card in a network switch to receive a first packet marked with a congestion indicator (CI);
a switch component in a central switching fabric coupled to the egress line card to set the CI; and
an ingress line card coupled to the switch component to perform a load-balancing operation among a plurality of physical links upstream from a point of congestion to alleviate the congestion upon receipt of a remote congestion indicator (RCI) triggered by the CI and to apply an integration filter to the RCI to determine relative congestion among a plurality of congested queues.

19. The apparatus of claim 18, wherein the physical links couple the ingress line card to the switch component.

20. The apparatus of claim 18, further including:
an ingress modular adapter component of the ingress line card to map a conversation associated with the first packet to a first physical link selected from the plurality of physical links.

21. The apparatus of claim 20, further including:
an egress modular adapter component of the ingress line card to receive the RCI from the egress line card and to pass the RCI to the ingress modular adapter component of the ingress line card.

22. A system, including:
an egress line card in a network switch to receive a first packet marked with a congestion indicator (CI);
a switch component in a central switching fabric coupled to the egress line card to set the CI;
an ingress line card coupled to the switch component to perform a load-balancing operation among a plurality of physical links upstream from a point of congestion to alleviate the congestion upon receipt of a remote congestion indicator (RCI) triggered by the CI and to apply an integration filter to the RCI to determine relative congestion among a plurality of congested queues; and
a display coupled to the network switch to perform configuration operations.

23. The system of claim 22, further including:
an egress modular adapter component of the egress line card to inspect the first packet for the CI.

24. The system of claim 22, further including:
an ingress modular adapter component of the egress line card to insert the RCI into a second packet to be transmitted to the egress modular adapter component of the ingress line card.

* * * * *